(12) United States Patent
Kweon et al.

(10) Patent No.: US 9,254,880 B2
(45) Date of Patent: Feb. 9, 2016

(54) COMPLETE BODY ASSEMBLING APPARATUS FOR VARIOUS VEHICLE MODELS

(71) Applicant: Hyundai Motor Company, Seoul (KR)
(72) Inventors: Seon Woo Kweon, Ulsan (KR); In Hyup Im, Gyeonggi-Do (KR)
(73) Assignee: Hyundai Motor Company, Seoul (KR)
(*) Notice: Subject to any disclaimer, the term of this patent is extended or adjusted under 35 U.S.C. 154(b) by 0 days.
(21) Appl. No.: 14/678,412
(22) Filed: Apr. 3, 2015
(65) Prior Publication Data
US 2015/0210331 A1 Jul. 30, 2015

Related U.S. Application Data

(62) Division of application No. 13/150,617, filed on Jun. 1, 2011, now Pat. No. 9,003,622.

(30) Foreign Application Priority Data

Dec. 1, 2010 (KR) .................. 10-2010-0121518

(51) Int. Cl.
| | | |
|---|---|---|
| B21D 53/88 | (2006.01) | |
| B62D 65/02 | (2006.01) | |
| B23K 31/02 | (2006.01) | |
| B23K 37/02 | (2006.01) | |
| B23K 37/04 | (2006.01) | |
| B23K 37/047 | (2006.01) | |
| B62D 33/06 | (2006.01) | |
| B23K 11/00 | (2006.01) | |

(52) U.S. Cl.
CPC ............ *B62D 65/022* (2013.01); *B23K 11/002* (2013.01); *B23K 31/02* (2013.01); *B23K 37/0235* (2013.01); *B23K 37/047* (2013.01); *B23K 37/0435* (2013.01); *B62D 33/06* (2013.01); *B62D 65/02* (2013.01); *B62D 65/024* (2013.01); *B62D 65/026* (2013.01); *B23K 2201/006* (2013.01); *B23K 2201/18* (2013.01); *B23P 2700/50* (2013.01); *Y10T 29/49622* (2015.01); *Y10T 29/49826* (2015.01); *Y10T 29/49895* (2015.01); *Y10T 29/53* (2015.01); *Y10T 29/53961* (2015.01); *Y10T 29/53974* (2015.01); *Y10T 29/53978* (2015.01)

(58) Field of Classification Search
CPC .... B62D 65/022; B62D 65/02; B62D 65/024; B62D 65/026; B23K 37/0435; Y10T 29/53974; Y10T 29/53978; Y10T 29/49895; Y10T 29/49622
See application file for complete search history.

(56) References Cited

U.S. PATENT DOCUMENTS 5,165,164 A 11/1992 Kubo et al.
2006/0032554 A1 2/2006 Sprague et al.

FOREIGN PATENT DOCUMENTS

| CN | 1582239 A | 2/2005 |
|---|---|---|
| JP | 11321736 | 11/1999 |
| JP | 2000-006861 | 1/2000 |
| JP | 2001-150251 | 6/2001 |
| JP | 2007-253814 | 10/2007 |
| KR | 10-2002-0084391 A | 11/2002 |

*Primary Examiner* — Ryan J Walters
(74) *Attorney, Agent, or Firm* — Mintz Levin Cohn Ferris Glovsky and Popeo, P.C.; Peter F. Corless (57) ABSTRACT

The present invention relates to an apparatus for assembling a front panel, a plurality of side panels, a back panel, and a roof panel in a complete body assembly line for various vehicles. The complete body assembling apparatus realizes a new type of a coupling apparatus by which hangers for vehicle models are held in a post buck in a complete body line for a vehicle and the post buck is flexibly movable depending on the changes in various vehicle models. This in turn, allows various vehicle models to be produced in a single process by flexibly coping with various vehicle models and enhancing the efficiency of an entire complete body assembling process.

2 Claims, 9 Drawing Sheets

FIG.1

Prior Art

COMPLETE BODY ASSEMBLING APPARATUS FOR VARIOUS VEHICLE MODELS

CROSS-REFERENCE TO RELATED APPLICATIONS

This application is a divisional application of U.S. application Ser. No. 13/150,617, filed Jun. 1, 2011, which claims under 35 U.S.C. §119(a) the benefit of Korean Patent Application No. 10-2010-0121518 filed Dec. 1, 2010, the entire contents of which are incorporated herein by reference.

BACKGROUND (a) Technical Field

The present invention relates to a complete body assembling apparatus for various vehicle models. More particularly, it relates to an apparatus for assembling a front panel, side panels, a back panel, and a roof panel in a complete body assembly line.

(b) Background Art

In general, a large number of vehicle parts are assembled through assembling and welding processes in mass-production lines in the course of manufacturing vehicles. In particular, a vehicle body is manufactured by assembling body panels produced through press processes, and floors, doors, trunk lids, hoods, and fenders are mounted to the body to be assembled.

Nowadays, vehicle manufactures employ a system for various vehicle models that enables flexible adaptation to changes in the bodies for the various vehicle models. Such a system is adapted to feed body panels and parts to assembly processes corresponding to a corresponding vehicle model to achieve automation of the processes.

Meanwhile, there is a process called a "main buck" in many processes of a body assembly line, and various panels, such as side panels, floor panels, front panels, and back panels, which are produced in sub-processes, are welded in the main buck process to form the shape of a vehicle.

For example, side panels and roof panels for various vehicle models are sequentially fed to a main buck process through top bogies or hangers according to the order of the vehicles, and lower floor panels are supplied to the main buck process through bogies or shuttles according to the order of the vehicles. Then, a jig, such as a rotary jig which can be rotated to three sides, serves to clamp and couple the panels supplied to the main buck process.

Figure 1:
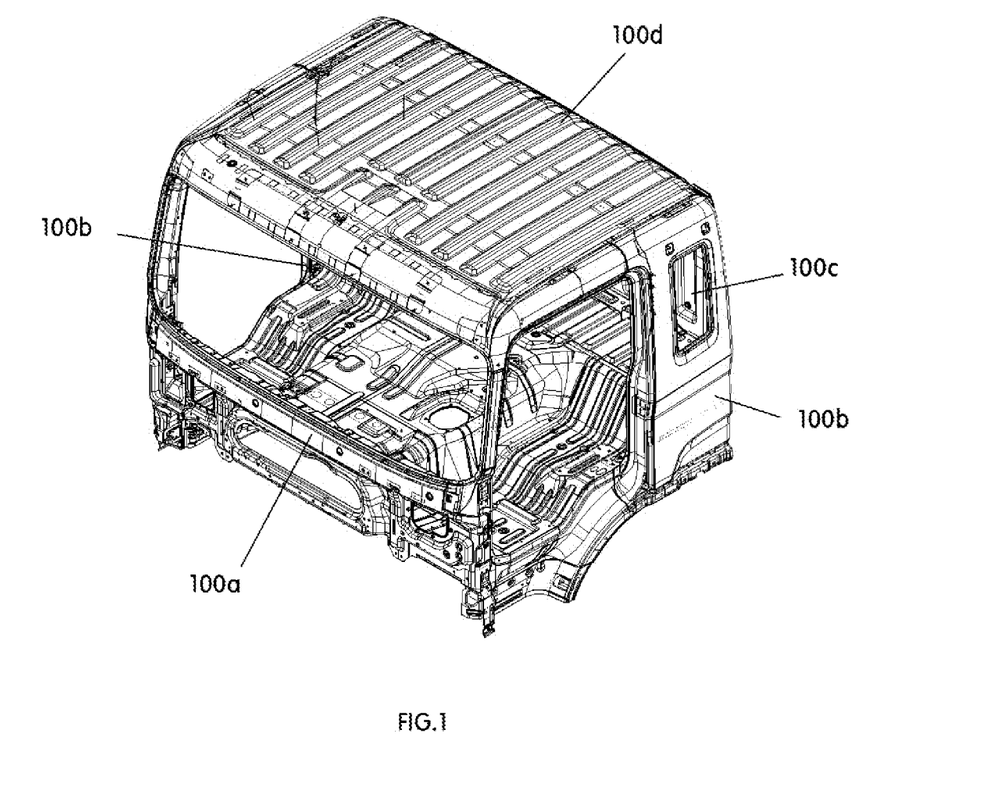
FIG. 1 is a perspective view illustrating a general complete body of a commercial vehicle.

As shown in FIG. 1, in a complete body line for vehicles (e.g., commercial vehicles, such as truck cabs), a front panel 100a, two side panels 100b, a back panel 100c, and a roof panel 100d are assembled to produce three different models of vehicles through a three-surfaced buck.

Figure 2:
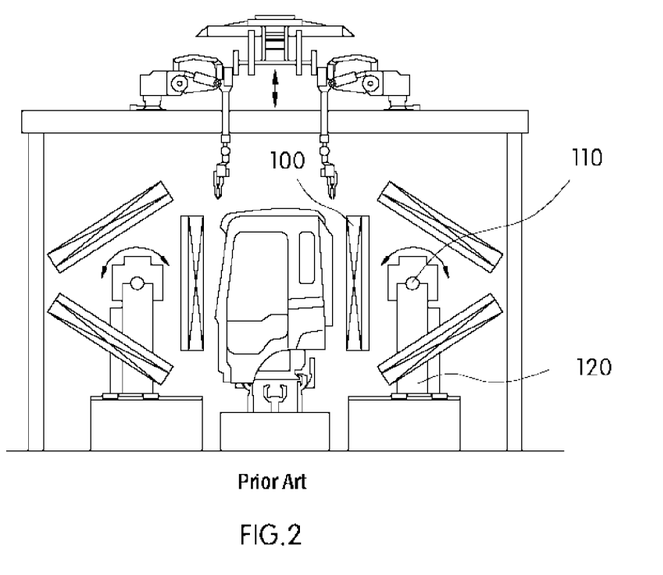
FIG. 2 is a schematic view illustrating equipment configured to produce thee vehicle models with a three-sided buck in a conventional complete body line for a commercial vehicle.

As shown in FIG. 2, for example, after panel parts 100 are loaded, a rotating body 110 rotates and moves forward, and after a gate 120 moves forward, a robot performs welding in working regions. After the welding is completed, the gates 120 move backward to take a waiting posture to load the following model vehicle.

However, the equipment for producing three different models of vehicles with three different side bucks in a conventional complete body line for commercial vehicles has the following disadvantages. First, the equipment is not sufficient to produce various vehicle models. Second, due to the complexity of a jig, it is difficult to perform this type of welding via a robot. Third, the system shown in FIGS. 1 and 2 is very large and thus requires a large space to operate. Fourth, due to the presence of many disorder-causing factors, a line operation rate is much lower than most automotive manufactures would like. Fifth, a very large rotating body is formed as an integrated body and thus its structure is very complex.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a complete body assembling apparatus for various vehicle models that utilizes a coupling apparatus by which hangers for vehicle models are held in a post buck in a complete body line for a vehicle and the post buck is flexibly movable depending on the changes in various vehicle models. Thus, this allows various vehicle models to be produced in a single process by flexibly adapting to the various vehicle models and enhancing the efficiency of an entire complete body assembling process.

In one aspect, the present invention provides a complete body assembling apparatus for various vehicle models which includes hangers, (e.g., four), where panels are coupled, which are assembled at four different sides, and a post buck which has a base where the hangers are assembled, and different posts, (e.g., four), installed on the base in a rectangular arrangement and having clamping units for fixing the hangers. In this embodiment, two of the four different posts are movable in a forward and backward direction. The hangers are assembled together at four different sides using the different posts to couple the panels on the hangers. Furthermore, the hangers for setting up the panels are loaded to or unloaded from the post buck by robots.

Illustratively, the positions of the two back posts adjacent to each other may vary along the forward and backward direction via the driving force of, e.g., a servo motor, and of the driving force of, e.g., a ball screw while the two back posts are being slidably guided in a linear motion (LM) guide on the base.

Advantageously, the hangers for various vehicle models using robots and a post buck flexibly movable according to the vehicle models are combined to assemble a complete body. This allows various vehicle models to be produced in a single process by actively coping with changes in vehicle models. Second, the equipment in the present invention is simple due to its hanger exchange manner, thus preventing generation of errors and enhancing line operating rate. Third, since the number of parts can be remarkably reduced and the size of the facility can be reduced, the entire structure of the facility can be simplified and the space occupying rate can be remarkably lowered.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Hereinafter, an exemplary embodiment of the present invention will be described below in detail with reference to the accompanying drawings such that those skilled in the art to which the present invention pertains can easily practice the present invention.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 3:
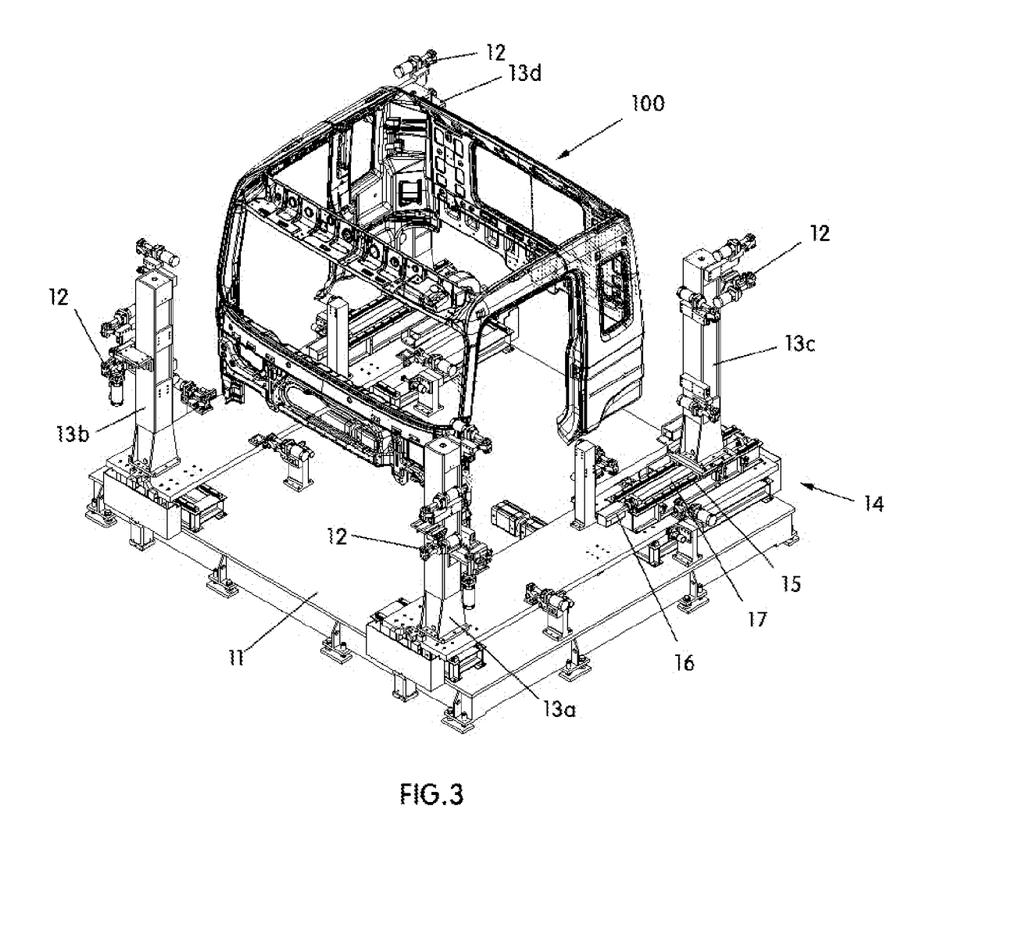
FIG. 3 is a perspective view illustrating a complete body assembling apparatus for various vehicle models according to an exemplary embodiment of the present invention.
Figure 4:
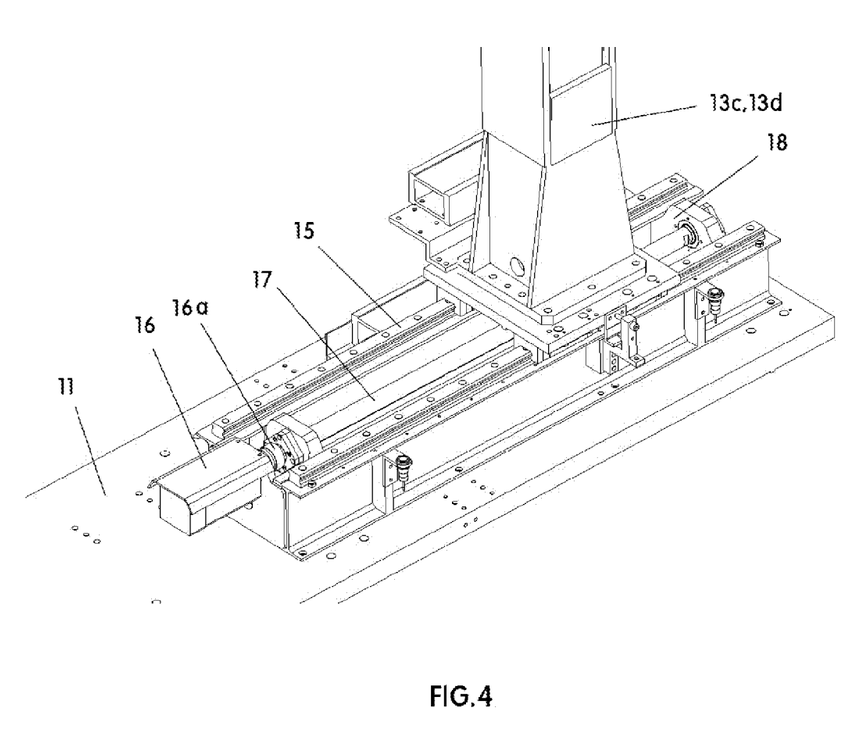
FIG. 4 is a back post converting unit in the complete body assembling apparatus for various vehicle models according to an exemplary embodiment of the present invention.

FIG. 3 is a perspective view illustrating a complete body assembling apparatus for various vehicle models according to an exemplary embodiment of the present invention. FIG. 4 is a back post converting unit in the complete body assembling apparatus for various vehicle models according to an exemplary embodiment of the present invention.

As shown in FIGS. 3 and 4, the complete body assembling apparatus for various vehicle models is a coupling apparatus for hangers which utilize a robot to secure the flexibility of a vehicle manufacturing line, and includes a base 11 and four different posts 13a, 13b, 13c, and 13d disposed on top of the base 11 in an upright position.

Clamping units 12 for fixing hangers 10 (as shown below in FIG. 5) are attached to the sides of the posts 13a, 13b, 13c, and 13d, and pins (not shown) having a certain shape are mounted to the hangers 10 such that the hangers 10 are coupled to the clamping units 12 using the pins. Upon being clamped, the coupled hangers 10 are integrated with the four different posts 13a, 13b, 13c, and 13d. That is, the hangers 10 are incorporated into the four posts 13a, 13b, 13c, and 13d to form a firm body, maintaining a constant strength.

To achieve this, the complete body assembling apparatus for various vehicle models includes four hangers 10 for setting panel parts such as a front panel, a plurality of side panels, a back panel, and a roof panel, and a post buck 14 configured to help combine four surfaces of the four hangers 10 while supporting the four hangers 10.

The hangers 10 is in the form of frame structures having shapes suitable to the characteristics of the shapes of the panel parts, and pins (not shown) are mounted to opposite sides of each hanger 10. The hangers 10 are coupled and fixed to the sides of the posts 13a, 13b, 13c, and 13d of the post buck 14 using the pins.

Here, the clamping units 12 for coupling the hangers 10 to the posts 13a, 13b, 13c, and 13d and the pins may be a common panel fixing clamping means. In this case, several hangers 10 may be provided for various vehicle models and can be exchanged to be used for the corresponding vehicle model, and may be handled via a robot to be loaded or unloaded on the side of the post buck 14.

The post buck 14 is configured to be a reference portion when the hangers 10 are assembled for a four-sided combination, and serves to clamp and grip opposite ends of the hanger 10, accordingly.

To achieve this, a base 11 is provided in the form of a rectangular plate structure and posts 13a, 13b, 13c, and 13d are installed at corners of the base 11 respectively, such that the four different posts 13a, 13b, 13c, and 13d installed in this way form a rectangular arrangement structure. For example, two front posts 13a and 13b and two back posts 13c and 13d forms a rectangular arrangement structure and are installed on the base 11.

In particular, with respect to the post buck 14, the locations of the posts may vary so as to flexibly correspond to the change in vehicle models. To achieve this, front posts 13a and 13b are fixed to two corners of the base 11, and back posts 13c and 13d may be moved forward and backward at the remaining two corners.

For example, linear motion (LM) guides 15, disposed side by side to provide movability forward and backward, are provided near the two corners of the base 11, that is, near the two corners where the back posts 13c and 13d are situated, and ball screws 17 are situated side by side on the inner side of the LM guides 15 and a servo motor 16 is disposed at one end of each LM guide 15 to provide a driving force.

Ends of the ball screws 17 are connected to shafts 16a of the servo motors 16 and opposite ends thereof are supported by brackets 18 having bearings (not shown). Lower ends of the back posts 13c and 13d are slidably guided by the LM guides 15 while at the same time supported by the LM guides 15, and are coupled to the ball screws 17 such that the ball screws 17 can be moved forward and backward via, e.g., electrical power.

Accordingly, if the servo motor 16 is driven, the back posts 13c and 13d are moved forward and backward via the ball screws 17, and then the back post 13c and 13d are moved forward and backward to positively to adjust for changes in vehicle models in the manufacturing line.

Figure 5:
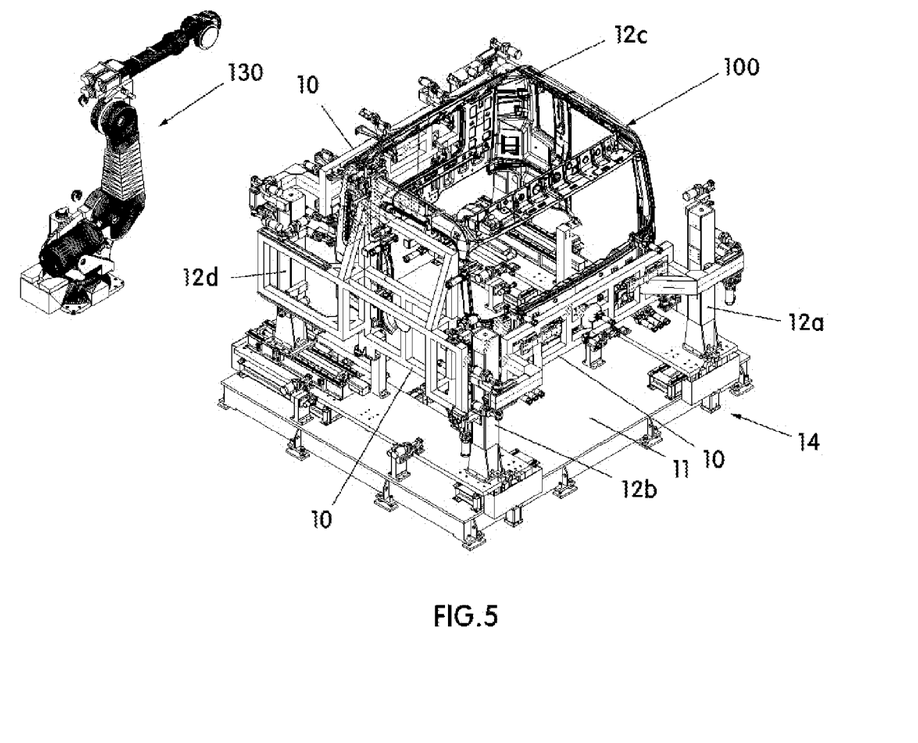
FIG. 5 is a perspective view illustrating a coupling state of a hanger and a post buck in the complete body assembling apparatus for various vehicle models according to an exemplary embodiment of the present invention.

FIG. 5 is a perspective view illustrating a coupling state of a hanger and a post buck in the complete body assembling apparatus for various vehicle models according to the illustrative embodiment of the present invention.

As shown in FIG. 5, the base 11 and the post buck 14 including the four different posts 13a, 13b, 13c, and 13d are installed in the body assembly line, and the four hangers 10 to which the panel parts 100 such as side panel and a back panel are moved toward the posts 13a, 13b, 13c, and 13d of the post buck 14 by the corresponding robots 130 and are clamped by the clamping units 12 in the posts 13a, 13b, 13c, and 13d while supported by the posts 13a, 13b, 13c, and 13d, forming four surfaces.

Figure 6A:
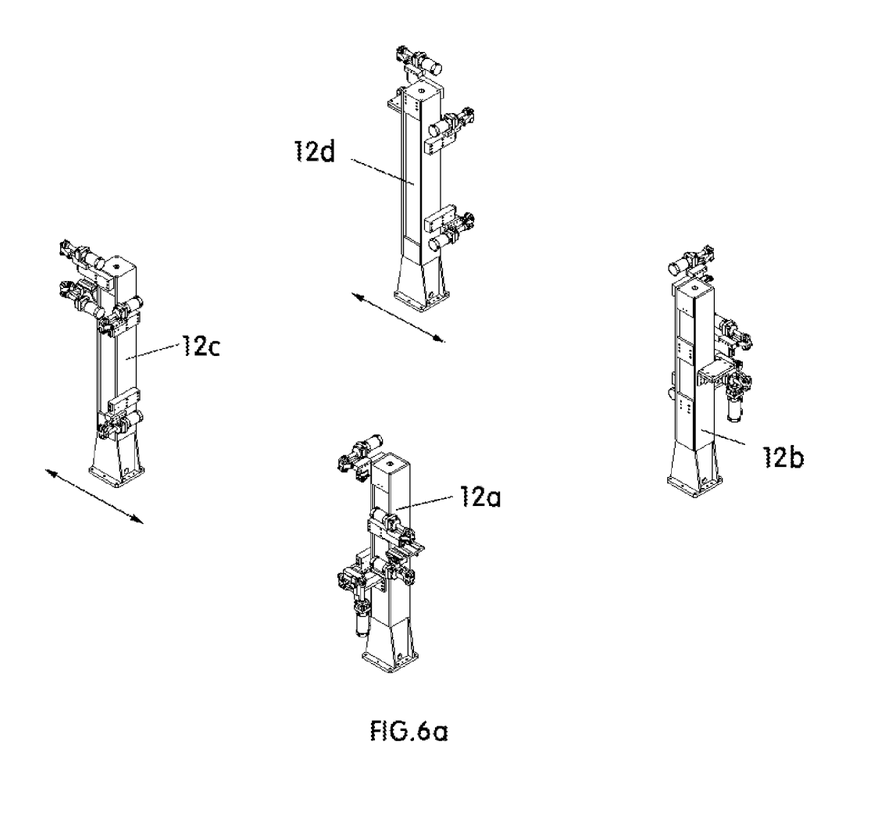
FIGS. 6A to 6D are schematic views illustrating coupling states of a complete body using the complete body assembling apparatus for various vehicle models according to an exemplary embodiment of the present invention.
Figure 6B:
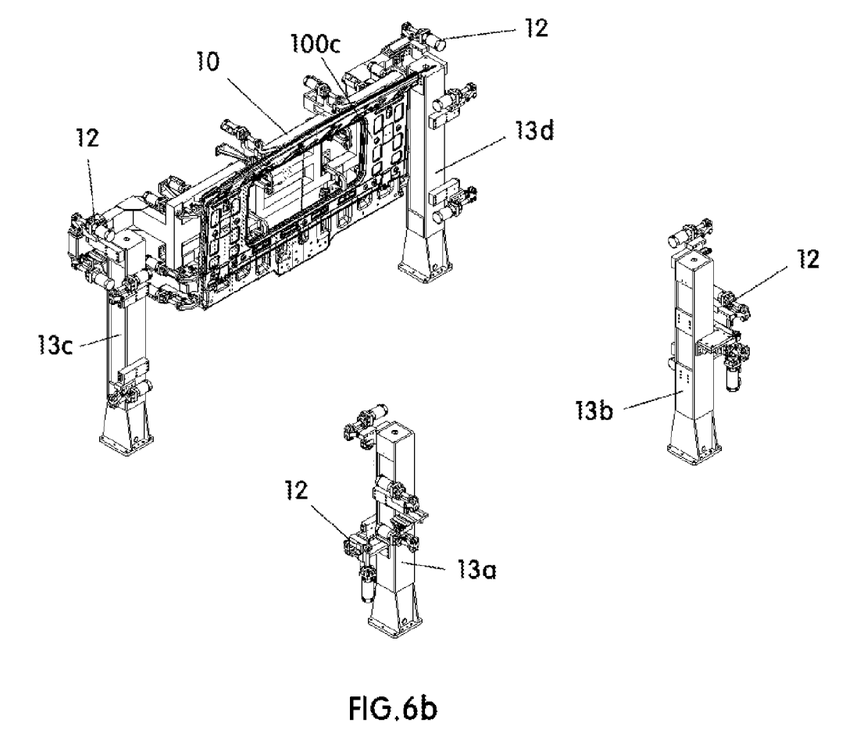
Figure 6C:
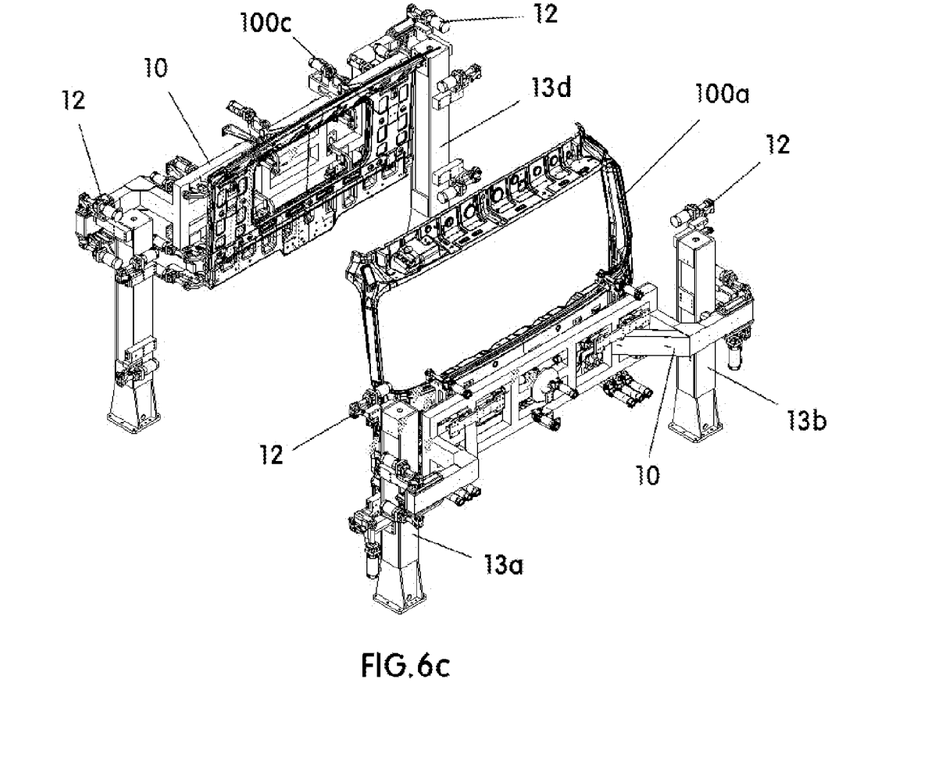
Figure 6D:
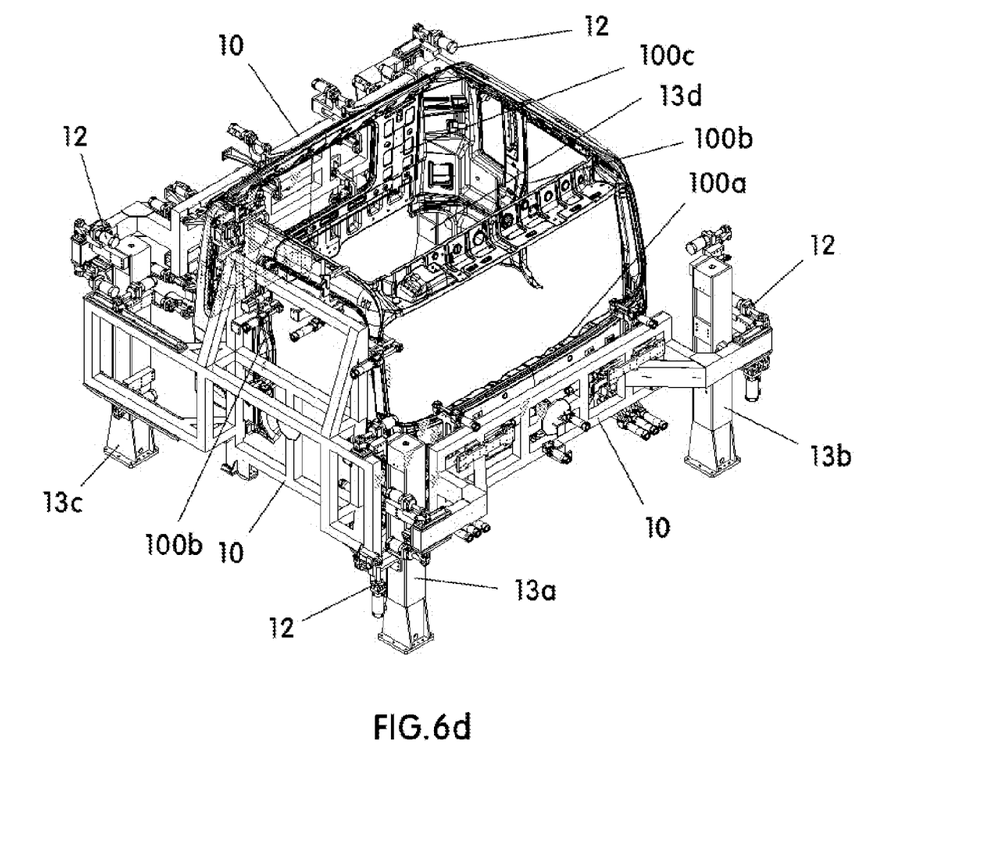

As the four hangers 10 are coupled to form four surfaces, the panel parts 100 in the hangers 10 are temporarily coupled, and the panels 100 are coupled to form a complete body while the robots 130 perform welding. For example, as shown in FIG. 6A, the positions of the posts 13a, 13b, 13c, and 13d are determined depending on the model of the vehicle before the panel parts 100 are loaded. That is, the two back posts 13c and 13d are moved forward and/or rearward to be positioned for that particular vehicle model's corresponding panels and dimensions. As shown in FIG. 6B, the hanger 10, where the back panel 100c is set by the robot 130, is loaded to be fixed between the opposite back posts 13c and 13d. As shown in FIG. 6C, the hanger 10, where the front panel 100a is set by the robot 130 is loaded to be fixed between the opposite front posts 13a and 13b. As shown in FIG. 6D, if the back panel 100c and the front panel 100a are completely fixed, the hangers 10, where the side panels 100b are set, are sequentially loaded by the robots 130 to be fixed between the opposite front post 13a and back post 13c and between the front post 13b and the back post 13d.

In this way, after the back panel 100c, the front panel 100a, and the two side panels 100b are coupled and arranged and the roof panel (not shown) is temporarily coupled by a crane unit (not shown), the coupling portions of the panels are welded by separate welding robots 130 to finish one complete body for a vehicle.

Advantageously, since hangers for various vehicles are held in a post buck in a complete body line for various vehicles and posts are flexibly moved according to models of vehicles, multiple models of vehicles can be changed and various vehicle models can be produced in a single process.

The invention has been described in detail with reference to an exemplary embodiment thereof. However, it will be appreciated by those skilled in the art that changes may be made in these embodiments without departing from the principles and spirit of the invention, the scope of which is defined in the appended claims and their equivalents. Further, many modifications may be made to specific situations and materials without departing from the essence of the invention. Therefore, the present invention is not limited to the detailed description of the preferred embodiment but includes all embodiments within the scope of the attached claims.

What is claimed is:

1. A method for assembling multiple vehicle models on a single assembly line, the method comprising:
   coupling, by a plurality of hangers, multiple panels on four different sides forming a vehicle cab;
   installing, via robots,
      a post buck including a base where the hangers are coupled, and
      at least four different posts on the base in a rectangular arrangement,
   fixing the hangers to each of the four different posts respectively via a clamping unit;
   moving, by a mechanical force, two of the four different posts forward or backward to account for a particular vehicle model,
   assembling the hangers together on four different sides of the vehicle cab using the at least four different posts to couple the panels on the hangers; and
   loading to or unloading the panels from the post buck via one or more robots.

2. The method of claim 1, wherein the of the two back posts are adjacent to each other and move forward and backward by a driving force of a servo motor and driving force of a ball screw while the two back posts are being slidably guided by an LM guide on the base.

* * * * *